United States Patent
Talur

(10) Patent No.: US 10,387,367 B2
(45) Date of Patent: Aug. 20, 2019

(54) DISTRIBUTED FILE SYSTEM WITH INTEGRATED FILE OBJECT CONVERSION

(71) Applicant: Red Hat, Inc., Raleigh, NC (US)

(72) Inventor: Raghavendra Talur, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 470 days.

(21) Appl. No.: 15/165,002

(22) Filed: May 26, 2016

(65) Prior Publication Data

US 2017/0344560 A1 Nov. 30, 2017

(51) Int. Cl.
 G06F 17/30 (2006.01)
 G06F 16/11 (2019.01)
 H04L 29/08 (2006.01)
 G06F 16/182 (2019.01)

(52) U.S. Cl.
 CPC .......... *G06F 16/116* (2019.01); *G06F 16/182* (2019.01); *H04L 67/06* (2013.01); *H04L 67/1097* (2013.01)

(58) Field of Classification Search
 CPC ................ G06F 17/30179; G06F 17/30076
 See application file for complete search history.

(56) References Cited

U.S. PATENT DOCUMENTS

| | | | |
|---|---|---|---|
| 6,549,918 B1 * | 4/2003 | Probert, Jr. | ........ G06F 17/30569 |
| 6,888,477 B2 | 5/2005 | Lai et al. | |
| 8,266,182 B2 | 9/2012 | Wanigasekara-Mohotti et al. | |
| 8,930,416 B2 | 6/2015 | Coudurier et al. | |
| 9,225,541 B2 | 12/2015 | Thomas et al. | |
| 2005/0005025 A1 | 1/2005 | Harville et al. | |
| 2006/0026162 A1 | 2/2006 | Salmonsen et al. | |
| 2012/0041964 A1 * | 2/2012 | Kreiner | ............ G06F 17/30179 707/756 |

(Continued)

FOREIGN PATENT DOCUMENTS

KR 20130122367 11/2013

OTHER PUBLICATIONS

Horacio Sanson, Luis Loyola and Daniel Pereira, "Scalable Distributed Architecture for Media Transcoding," Algorithms and Architectures for Parallel Processing, vol. 7439, Springer Berlin Heidelberg, http://allm.net/wp-content/uploads/2014/10/rd2012_01_2_ica3pp_paper.pdf, 2012, 15 pages.

(Continued)

*Primary Examiner* — Hung Q Pham
(74) *Attorney, Agent, or Firm* — Lowenstein Sandler LLP

(57) ABSTRACT

Systems and methods for enhancing a distributed file system to provide multiple formats of a file object by creating the file object in a requested format. An example method may comprise: receiving, by a distributed file system comprising a plurality of nodes, a request for a file object in a first format; determining whether the file object in the first format is available on the distributed file system; in response to determining the file object in the first format is missing, querying a node of the plurality of nodes to determine whether the file object is available in a second format on the distributed file system; and creating, by a processing device of the distributed file system, the file object in the first format in view of a file object in the second format when the file object is available in the second format.

17 Claims, 5 Drawing Sheets

(56) References Cited

U.S. PATENT DOCUMENTS

| | | | |
|---|---|---|---|
| 2014/0122489 A1* | 5/2014 | Mesnier | H04L 67/1097 |
| | | | 707/737 |
| 2015/0125133 A1 | 5/2015 | Kim et al. | |
| 2015/0244757 A1 | 8/2015 | Zhuang et al. | |

OTHER PUBLICATIONS

Red Hat Engineering Content Services, "Red Hat Enterprise Linux 6 6.5 Release Notes" Release Notes for Red Hat Enterprise Linux 6.5, Edition 5, https://access.redhat.com/documentation/en-US/Red_Hat_Enterprise_Linux/6/html-single/6.5_Release_Notes/, Nov. 2013, 28 pages.

* cited by examiner

DISTRIBUTED FILE SYSTEM WITH INTEGRATED FILE OBJECT CONVERSION

TECHNICAL FIELD

The present disclosure generally relates to distributed file systems for storing and accessing file objects, and more specifically relates to a distributed file system that provides a file object in multiple formats.

BACKGROUND

Modern computers may use a distributed file system to store files across different storage devices. Multiple clients may access a distributed file system and request access to files with different formats. Some systems may store multiple files in multiple formats and the client may be responsible for requesting the file with the correct format. Other systems may store a single copy of a file and provide the file to the client, which may be responsible for converting the file to a particular format.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
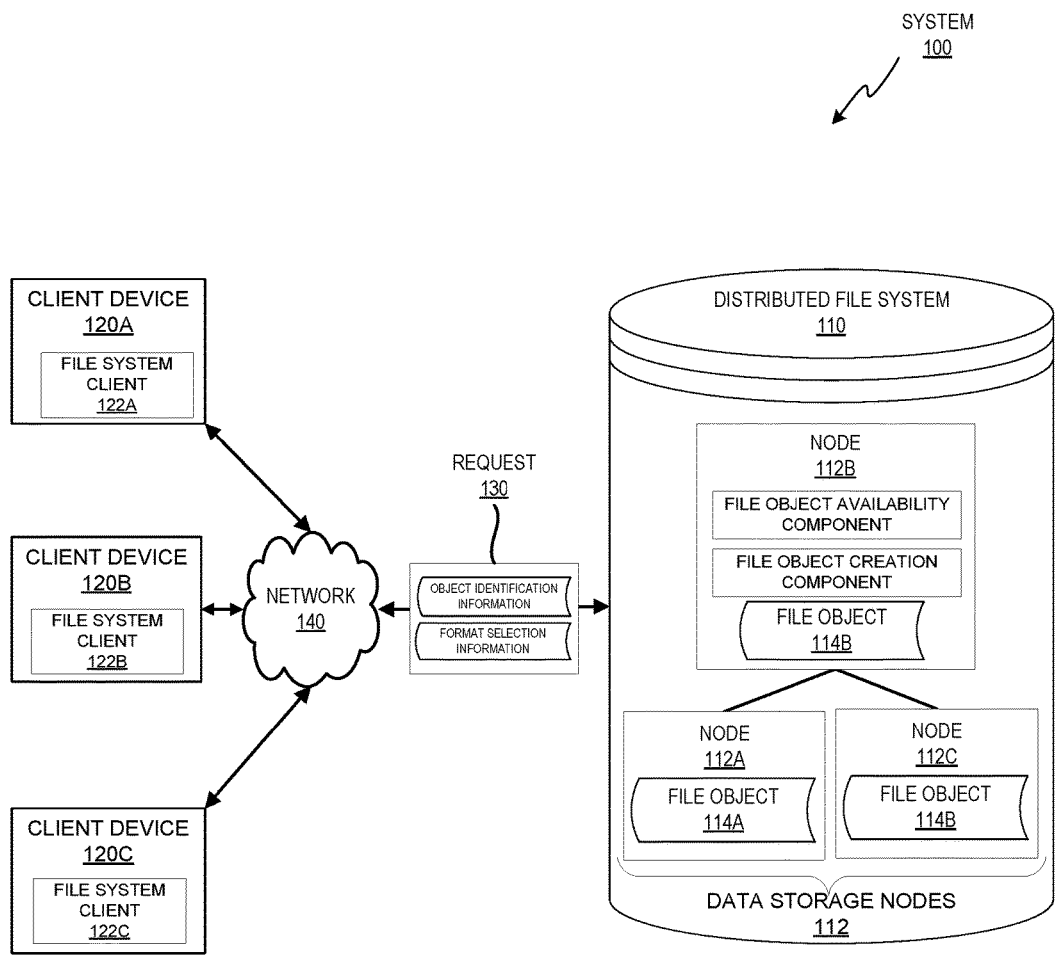
FIG. 1 depicts a high-level diagram of an example system architecture of a distributed file system, in accordance with one or more aspects of the present disclosure.

Described herein are methods and systems for enhancing a distributed file system to provide multiple formats of a file object by creating a file object with a specific format in response to a request. Traditional file systems may receive a request to retrieve a file object with a particular format and when the file system does not include the file object with the particular format, the file system may indicate the request failed. To reduce the number of failed requests the file system may be modified to include each of the multiple formats of the file object, but this may increase the amount of storage space used. To more efficiently use storage space, the file system may include a single format of the file object and another device, such as a streaming server, may convert the single format to a requested format. When multiple streaming servers are involved, they may each convert the file object to the same format, which may be an inefficient use of processing power.

Aspects of the present disclosure address the above and other deficiencies of traditional file systems. In one example, a distributed file system may include technology for converting a file object to one or more formats. The distributed file system may include multiple storage nodes that store multiple file objects. Each file object may be a file or a portion of a file and may include data such as image data, audio data, textual data, or a combination thereof. The distributed file system may provide the file object in one or more formats. The format may be based on digital container formats (e.g., MPEG4 (MP4), QuickTime® (MOV)), resolutions, bit rates, formatting (e.g., encoding) data, or a combination thereof. In one example, the file objects may be media items and the distributed file system may provide the media items to clients in multiple different formats.

The distributed file system may store file objects in one or more formats and may provide the file objects to clients in one or more other formats when requested. A client may request access to a file object in multiple different formats and one or more of the formats may not currently be stored within the distributed file system. The request may be received by the distributed file system and the request may specify a format of the file object. In one example, the request may include an identifier of the file object and may include information identifying a particular format for the file object. In another example, the request may specify a particular file object with a particular format (e.g., FileObject.MP4 or FileObject.MOV). The file object with the particular format may have been previously generated by the distributed file system or may be generated in response to receiving the request from the client. The distributed file system may generate one or more formats of the file object using conversion functionality. The conversion functionality may enable the distributed file system to convert data of a file object from a first format to a second format. Converting data may involve merging, editing, decoding, encoding, recoding, transcoding, formatting, reformatting, trans-rating or other transformation of data.

Systems and methods described herein include technology that enhances the performance and scalability of a distributed file system. In particular, aspects of the present disclosure reduce the amount of storage space necessary to provide clients with multiple formats by storing a file object in a subset of the multiple formats. Aspects of the present invention also reduce the computing needs of the clients. For example, when multiple clients are accessing the same format of a file object, the distributed file system may perform the conversion once and avoid the multiple clients from performing duplicative conversions. The distributed file system may also reduce the computing needs of the distributed file system by analyzing incoming requests for specific formats and transmitting them to a node that has previously performed the conversion. Various aspects of the above referenced methods and systems are described in details herein below by way of examples, rather than by way of limitation.

FIG. 1 illustrates an example system 100, in accordance with an implementation of the disclosure. The system 100 may include a distributed file system 110, client devices 120A-C, a request 130, and a network 140. Network 140 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, and/or various combinations thereof.

Distributed file system 110 may span multiple data storage nodes 112 and may be accessed by client devices 120A-C by traversing one or more networks 140. Data storage nodes 112 may be capable of storing data for the distributed file system 110 and may function together to create, store, and modify file objects 114A-C. Each of the data storage nodes 112 may correspond to a region of storage space (e.g., volume, sub-volume, partition) and may be arranged in a hierarchical manner such that node 112B may provide access to a volume of data storage and nodes 112A and 112C may each provide access to a portion of the volume (e.g., sub-volume).

Distributed file system 110 may have decentralized file system management, centralized file system management or a combination of both (e.g., hierarchical). A decentralized file system management may include a file system that has more than one node (e.g., all nodes) managing the data storage activities of data storage nodes 112. A centralized file system management may include a distributed file system 110 where one of the nodes manages the data storage activities of some or all of the other nodes. Distributed file system 110 may also have a partially centralized and partially decentralized management. For example, there may be an arrangement that includes multiple nodes in a hierarchical arrangement (e.g., tree or star storage topology) such that a top-level node manages one or more mid-level nodes and a mid-level node manages one or more lower-level nodes. A simplified hierarchical arrangement is illustrated in FIG. 1 in regards to nodes 112A-C.

File objects 114A-C may include file content, file metadata, or other information used by distributed file system 110 to store, manage, or organize data. The metadata may include one or more attributes or extended attributes such as identifiers (e.g., GUID, UUID), names (e.g., file name, directory name), permissions (e.g., read, write execute), type (e.g., file type), ownership, creation time, or other attributes. A file object may be a data structure that organizes data and identifies portions (e.g., locations) within a storage space (e.g., data store) that contain the corresponding data. File objects 114A-C may include image data (e.g., pictures, photographs, motion pictures), audio data (e.g., sound tracks), textual data (e.g., words, symbols), haptic data (e.g., tactile feedback), or a combination thereof. In one example, file objects 114A-C may be media items such as images, audio tracks, or videos. The term "media item" may also include multi-media items which include multiple different forms of media, such as both audio data and video data.

Each of the file objects 114A-C may be the same file object with different formats. A format of a file object may specify how different elements of data and metadata coexist within a file object and may indicate how different data types are interleaved. The format of a file object may be based on how the file object was encoded and therefore a format may be the same or similar to an encoding. The format may be based on a digital container format, such as a multimedia container format. A multimedia container format may specify how different types of media may inter-related to one another. For example, a file object may contain one or more audio streams (Dolby® surround sound), one or more image streams (e.g., three dimensional video), subtitles, chapter-information, synchronization information, meta-data (e.g., tags), other information, or a combination thereof.

Different formats may have different characteristics to accommodate different uses of the file object. For example, different formats may have different display resolutions (e.g., 720p, 1080p, 4K)), streaming bit-rates (e.g., 16 Kbps, 1.8 Mbps, 40 Mbps), quality (e.g., sound quality, image quality), storage space, other characteristics, or combination of characteristics. Some example formats (e.g., container formats) include image formats, audio formats, and video formats. Image formats may include: Joint Photographic Experts Group (JPEG); Tagged Image File Format (TIFF); or Graphic Interchange Format (GIV). Audio formats may include: Waveform Audio File Format (WAV); Extensible Music Format (XMF); or Moving Picture Experts Group—3 (MP3). The video formats may include: Moving Picture Experts Group format (e.g., MPEG; MP4); Apple Quicktime® movie format (MOV); or Media Data Extended (MDX).

Nodes 112A-C may each be associated with the same computing device or may each be associated with one or more different computing devices. In one example, nodes 112A-C may be located on the same computing device and each of nodes 112A-C may be associated with a separate computing process that manages its portion of storage space. In another example, nodes 112A-C may each be located on a separate computing device (e.g., node device) that is connected with one or more of the other node devices. Each of the separate computing devices may be capable of participating in a distributed file system and may be a client device (e.g., desktop, laptop, and tablet), a server device (e.g., server of a cluster), a data storage device (e.g., Network Attached Storage (NAS) or Storage Area Network (SAN)), other computing device, or a combination thereof. Data storage nodes 112 may each contribute data storage resources, data processing resources or a combination thereof. In one example, all of the nodes may provide data storage resources and data processing resources for distributed file system 110. In another example, one or more of the nodes may provide data processing resources to manage other nodes without providing data storage resources to store file objects for distributed file system 110.

Client devices 120A-C may communicate with distributed file system 110 to add, remove, access, or modify file objects 114A-C. Client devices 120A-C may be external to the distributed file system 110, as shown in FIG. 1, or may be internal to the distributed file system. For example, node 112C may function as a client device for node 112B. Each of the client devices 120A-C may have one or more connections with one or more nodes 112A-C. The connection may be an indirect connection with a node or a direct connection with a node. An indirect connection with a node may include a combination of one or more communication channels that pass through an intermediate node. For example, an indirect connection between client device 120A and node 112C may involve a first communication channel between client device 120A and node 112B and a second communication channel between node 112B and node 112C. A direct connection is one in which a client device 120A has a communication channel between itself and a node (e.g., 112C) without traversing an intermediate node.

Client devices 120A-C may include file system clients 122A-C for accessing distributed file system 110. File system client 122 may provide client devices 120A-C with the ability to access file objects in one or more formats. File system client 122 may run at any level of privilege such as running as part of a kernel or in a kernel mode (e.g., supervisor, master, privileged mode) or as part of a user space in user mode. File system client 122 may be packaged with an operating system or may be added or installed to an existing operating system. In one example, File system client 122 may be a mount process (e.g., daemon, service) that runs on client device 120 and may support an operating systems native API. The native API may be any standardized or proprietary operating system API, such as the Portable Operating System Interview (POSIX) API or the Microsoft Windows® API. In another example, file system client 122 may include additional functionality not supported by the operating system native API. For example, the file system client 122 may provide the client device with an API that enables the file system client to query the distributed file system for supported file object formats or to specify one or more preferred file object formats. In either example, the file system client 122 may support transmitting requests 130 for formatted file objects and for receiving responses containing a file object in a specified format.

Request 130 may be a signal or message sent from a client (e.g., client device 120B or node 112B) to access a file object within distributed file system 110. Request 130 may include file identification information for identifying one or more file objects 114A-C with one or more particular formats. In one example, the request 130 may include file identification information that identifies a specific file object with a specific format. The file object with the specific format may previously exist within the distributed file system or may be generated in response to the request 130. In the example shown in FIG. 1, request 130 may include file identification information with multiple portions. A first portion may include object identification information and a second portion may include format selection information. The object identification information may include a file object identifier for identifying a file object (e.g., media item) without identifying a specific format. The format selection information may identify one or more formats of the file object that are being requested.

Figure 2:
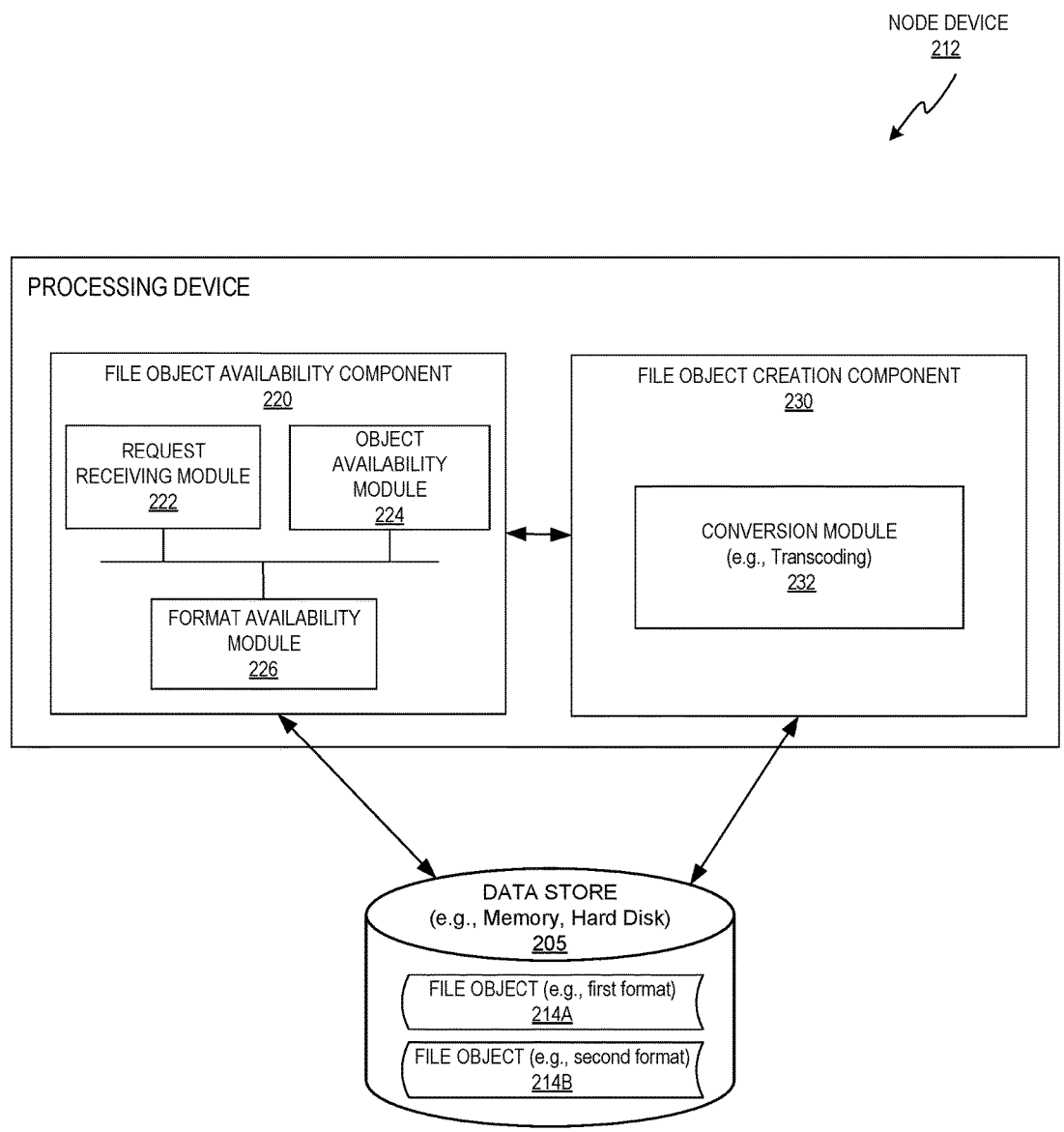
FIG. 2 depicts a high-level diagram of an example node of the distributed file system, in accordance with one or more aspects of the present disclosure.

FIG. 2 depicts a block diagram of an exemplary node 212 that contributes to a distributed file system (not shown) and processes requests for file objects. Node 212 may be the same or similar to node 112A of FIG. 1 and may include a data store 205, a file object availability component 220, and a file object creation component 230.

Data store 205 may be any device or combination of devices capable of storing file object 214A and file object 214B. Data store 205 may include any persistent storage (e.g., non-volatile storage), non-persistent storage (e.g., volatile storage), or a combination thereof. Data store 205 may be capable of storing multiple formats of a file object. In one example, file objects 214A and 214B may both be related to the same object but may be in different formats. For example, file objects 214A and 214B may both be related to the same media item (e.g., media object) and file object 214 may be the media item in a first format and file object 214 may be the same media item in a second format.

File objects 214A and 214B may be complete file objects or portions of file objects. A complete file object may be a file object that is formatted in a manner that enables the file object to be consumed by a client device. A portion of a file object may not be ready to be consumed by a client device and may require being combined with one or more other portions of a file object to generate a complete file object. For example, a complete file object may be a video and a first portion of the file object may be the motion picture portion of the video and a second portion of the file object may be an audio portion of the video and the distributed file system may combine these portions to generate the complete file object. Additional steps may be performed on a completed file object in order to enable a client to consume the file object. The additional steps may involve modifying the formatting of the completed file object or one of the portions of the file object as discussed below in regards to conversion module 232.

File object availability component 220 may be a portion of a node that handles access requests and searches one or more nodes of the distributed file system to locate the file object or one or more portions of a file object. File object availability component 220 may include a request receiving module 222, an object availability module 224, and a format availability module 226.

Request receiving module 222 may receive one or more requests for file objects from one or more clients and may begin processing the requests. The requests may be initiated by a client (e.g., client device or node device) and may be received by at least one node of the distributed file system either directly or indirectly from the client. Processing the requests may involve analyzing the content of the request to identify information indicating a file object and a specified format. This information may be passed to object availability module 224 and format availability module 226 for subsequent processing.

Object availability module 224 may use object identification information received by request receiving module 222 and may search the distributed file system for the file object. Searching the distributed file system may involve initiating a query of one or more nodes of the distributed file system to determine if one or more nodes include the file object or a portion of the file object. In one example, searching for a file object may involve searching for the file object in any format. In another example, searching for a file object may involve searching for a file object having a specific format. In either example, object availability module 224 may interact with format availability module 226 to determine whether the file object with the specified format is available on the distributed file system. In one example, object availability module 224 and format availability module 226 may be integrated into a single module that determines whether the file object is available in a specified format or any other available formats.

Format availability module 226 may receive information about the file object from object availability module 224 and may determine whether a particular format of the file object is available. Determining the availability of a particular format may involve identifying a format in view of the file object information (e.g., format selection information), which may be contained within the request. Format availability module 226 may then determine whether the file object already exists in the format within the distributed data store. In one example, format availability module 226 may determine whether the file object already exists in the particular format by checking a locally stored data structure (e.g., index, map) that indicates which nodes have which file objects and/or formats of the file objects. In another example, format availability module 226 may determine whether the file object already exists in the particular format by initiating a query of one or more nodes of the distributed file system. The query may be similar to the query used to identify the file object and may be executed on one or more nodes to determine if the one or more nodes include the file object with the particular format. When a node that includes the specific format is detected, the format availability module 226 may either instruct the node to process the request or may initiate a response to the client that provides the file object with the particular format or identifies the location of the file object having the particular format. When there are no nodes that include the specific format, the format availability module 226 may interact with file object creation component 230.

File object creation component 230 may interact with file object availability component 220 and may create a file object with a particular format from a file object in a different format. File object creation component 230 may include a conversion module 232 that may perform a conversion procedure on a file object to convert the file object to a different format. In one example, the conversion procedure may involve decoding, encoding, transcoding, recoding, merging, editing, trans-rating (e.g., alternating bit-rate), or other transformation of data. Conversion module 232 may determine which formats of the file object are available from format availability module 226 and may determine whether one of the available formats may be used to create or convert the file object to the requested format. When multiple formats of a file object are available, conversion module 232 may compare the available formats of the file object to identify a best candidate for the conversion procedure.

Conversion module 232 may compare formats by taking into account a resolution, a bit rate, a content quality or other factors associated with the available file objects. In one example, conversion module 232 may determine it can create the requested format because it has identified a file object that is formatted with a resolution or bit rate that is larger than that of the requested format. In another example, the conversion module 232 may determine it cannot create the requested format because the existing formats of the file object have a resolution or bit rate that exceeds a threshold for conversion to the particular format. For example, there may be a limit to the ability for conversion module 232 to increase resolution or bit-rate when existing formats of the file object do not include sufficient amounts of information.

Conversion module 232 may access formatting data that may be stored within a node of the distributed file system and may enable node 212 to modify the format of a file object. The formatting data may include one or more functions for converting a file object from a format to one or more other formats. The functions may enable node device 212 to convert the file object from a first digital format to second digital format and may involve encoding, decoding or transcoding (e.g., decoding and encoding) technology.

In other examples, node device 212 may include a storage module that identifies formats that a file object may be stored in and how long the file object should be stored in those formats. The storage module may receive one or more file objects and for each new file object, the storage module may determine one or more formats for the file object to be stored in. The storage module may select specific formats, which may be a subset of a set of available formats, by determining which formats are expected to be in demand (e.g., requested at least once or requested most often). Storage module may also determine when the distributed file system may remove (e.g., scrub) one of the formats of the file object from the distributed file system. For example, the storage module may monitor or track the use of the specific formats of a file object and after a threshold period of time elapses without the particular format of the file object being accessed the storage module may remove the particular format. In one example, storage module may check if the particular format can be recreated from other formats of the file object before removing the particular format and if it cannot it may delay removing the particular format.

The determination of which formats should be created and removed may be based on one or more rules, settings, or historical data. The rules and settings may be based on one or more characteristics of a file object and may be used to identify a particular format. The characteristics may be based on a size, an author, an owner, a type, a time/date, or other information of the file object. The rules and settings may be based on user input from an IT administrator, a user, a product designer, or other individual. The historical data may include previously requested file object formats. For example, if the file object is a type of video and most requests for this type of file object are for a few specific formats (e.g., MPEG4 format, MOV format, MDX format) then the storage module may determine that the recently received file object should be stored in each of the specific formats. This may involve the storage module interacting with file object creation component 230 to create multiple file objects in each of the multiple formats prior to receiving a request identifying the file object and one of the formats.

In another example, the storage module may consolidate a plurality of formats of a file object into a single format or a subset of available formats. This may be advantageous because this may reduce the storage occupied by the multiple formats yet may still enable the distributed computing device to create the file object if it is requested. The consolidation may occur when a file object is received or after the file objects have been stored, such as hours, days, weeks, or other duration of time after the file object has been stored. In one example, the distributed file system may receive a file object (e.g., media item) in multiple formats and may consolidate the file object formats and store the file object in a single format or a subset of the formats. The formats may be one of the existing formats or may be a different format, such as a base format. A base format may be similar to a raw format that may provide the most amount of information and may support a conversion procedure to multiple different formats. The storage module may determine the base format for the file object in view of the multiple formats. For example, the storage module may select a format that can be converted to the most amount of other formats (e.g., selection of a highest resolution format). Storage module may then store the base format for the media item and discard the media item in the one or more other formats.

Figure 3:
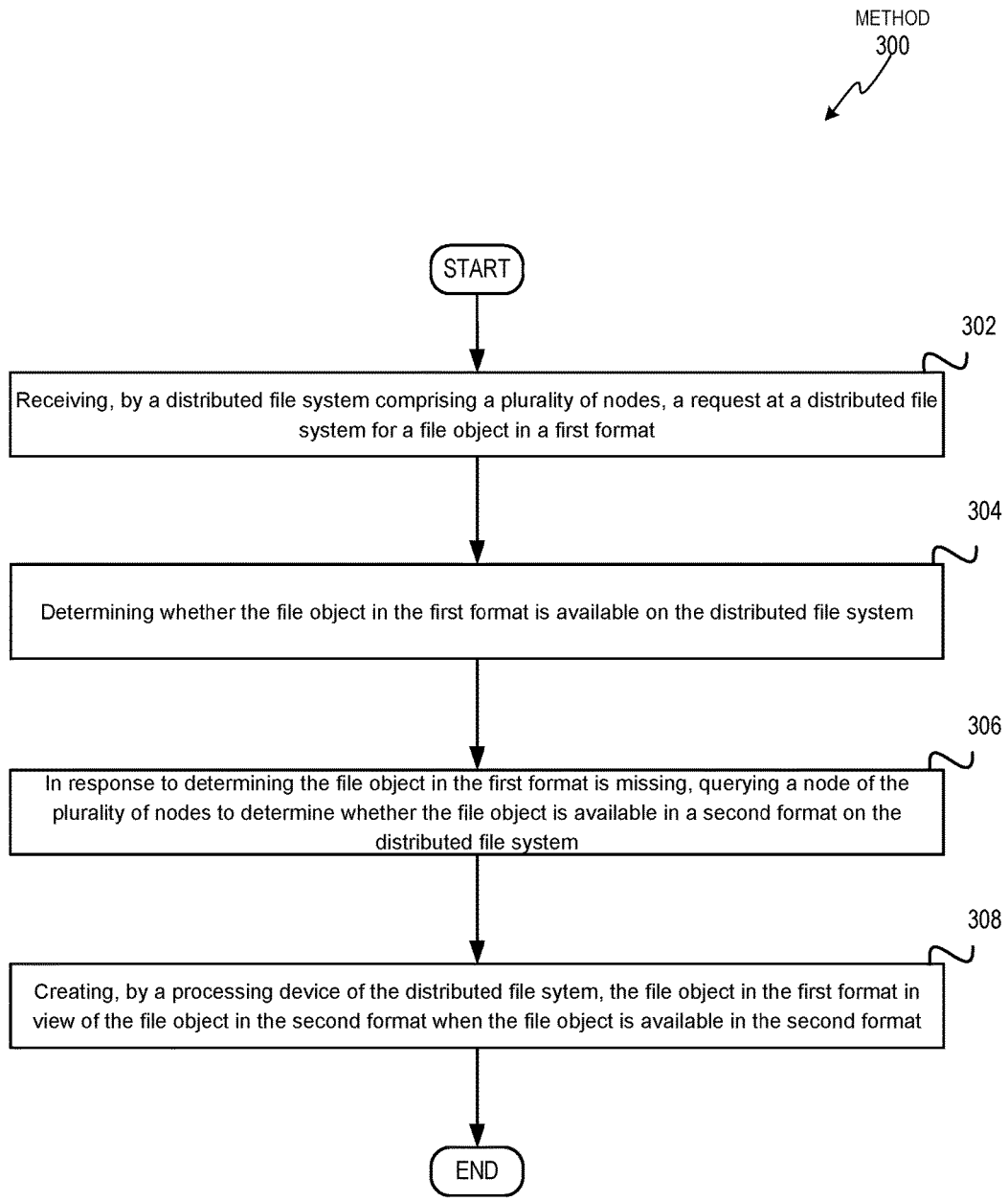
FIG. 3 depicts a flow diagram of an example method for having a distributed file system perform file object conversion, in accordance with one or more aspects of the present disclosure.
Figure 4:
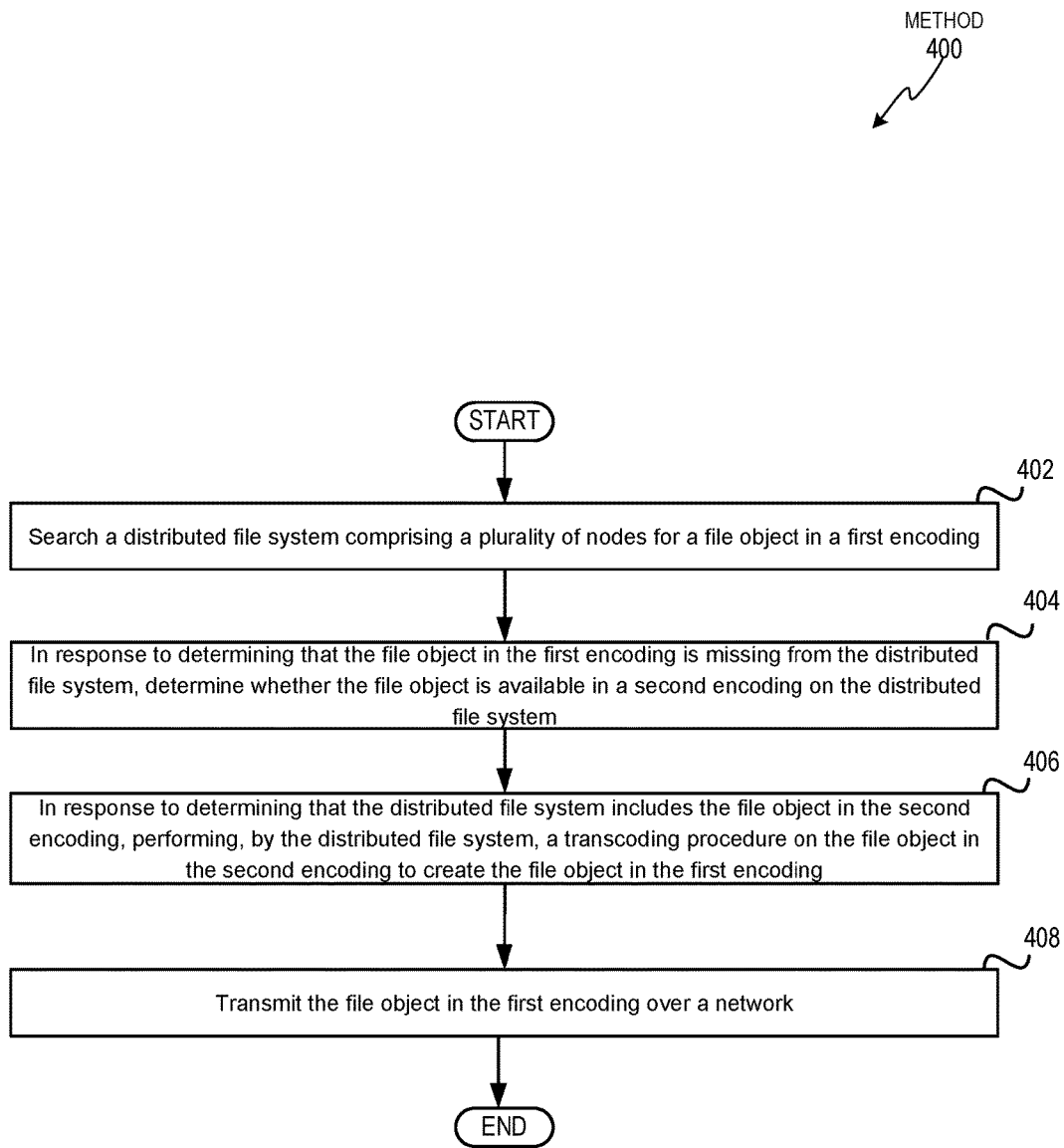
FIG. 4 depicts a flow diagram of another example method for having a distributed file system perform file object conversion, in accordance with one or more aspects of the present disclosure.

FIGS. 3 and 4 depict flow diagrams for illustrative examples of methods 300 and 400 for integrating file object conversion into a distributed file system. Method 300 includes a method of receiving requests for a file object in a format that is not currently available within the distributed file system and having the distributed file system create the file object from the file object in another format. Method 400 may include a method similar to method 300 and may involve searching a distribute file system for a first encoding of a file object and performing a transcoding to create the first encoding of the file object. Methods 300 and 400 may be performed by processing devices that may comprise hardware (e.g., circuitry, dedicated logic), computer readable instructions (e.g., run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by nodes 112A-C and 212 as shown in FIGS. 1 and 2 respectively.

Referring to FIG. 3, method 300 may be performed by processing devices of a computing device and may begin at block 302. At block 302, a processing device of a distributed file system may receive a request for a file object in a first format. The distributed file system may comprise a plurality of storage node devices that are interconnected over a network. The processing device of the distributed file system may receive the request for a media item over a network from a media service. In one example, the request may be received at the distributed file system from a mount process executing on a client device and the request may conform to a POSIX standard. In another example, the request may be received at the distributed file system from a process executing on a client and the request may comprise a file object identifier for the file object and information identifying the first format for the file object.

At block 304, the processing device may determine whether the file object in the first format is available on the distributed file system. In one example, determining whether the file object is available may involve querying one or more nodes of the distributed file system for the file object in the first format. The first format of the file object may comprise interleaved audio data and video data (e.g., motion picture data). In another example, the processing device may also or alternatively determine whether the file object is available in any other format on the distributed file system.

At block 306, the processing device of the distributed file system may, in response to determining the file object in the first file format is missing, querying a node of the plurality of nodes to determine whether the file object is available in a second format on the distributed file system.

At block 308, the processing device may create the file object in the first format in view of a file object in the second format when the file object is available in the second format. Creating the file object in the first format may comprise the distributed file system transcoding the file object in the second format to the file object in the first format. In one example, the processing device may also transmit the file object in the first format over a network to a device that transmitted the request. Responsive to completing the operations described herein above with references to block 306, the method may terminate.

Referring to FIG. 4, method 400 may be performed by processing devices of a computing device and may begin at block 402. At block 402, a processing device may search a distributed file system comprising a plurality of nodes for a file object in a first encoding. The file object and the first encoding may be specified by a request received from another device (e.g., client device or another node of the distributed file system).

At block 404, the processing device may, in response to determining that the file object in the first encoding is missing from the distributed file system, determine whether the file object is available in a second encoding on the distributed file system. In one example, the file object may be a media item and the first or second format of the file object may be selected based on a container format of the media item, a resolution of the media item, or a bit rate for serving the media item. The container format of the media item may formatted in at least one of, an MP4 format, an MOV format, or an MDX format.

At block 406, the processing device may perform, by the distributed file system, a transcoding procedure on the file object with the second encoding to create the file object in the first encoding. The transcoding procedure may be performed by conversion module 232 as discussed in regards to FIG. 2.

At block 408, the processing device of the distributed file system may transmit the file object in the first encoding over a network. In addition to transmitting the file object the distributed file system may store the file object in the first encoding (e.g., format) on the first node of the distributed file system. This may enable to the processing device of the distributed file system to provide the file object in the first encoding in response to another request without re-creating (e.g., re-transcoding) the file object. Responsive to completing the operations described herein above with references to block 408, the method may terminate.

Figure 5:
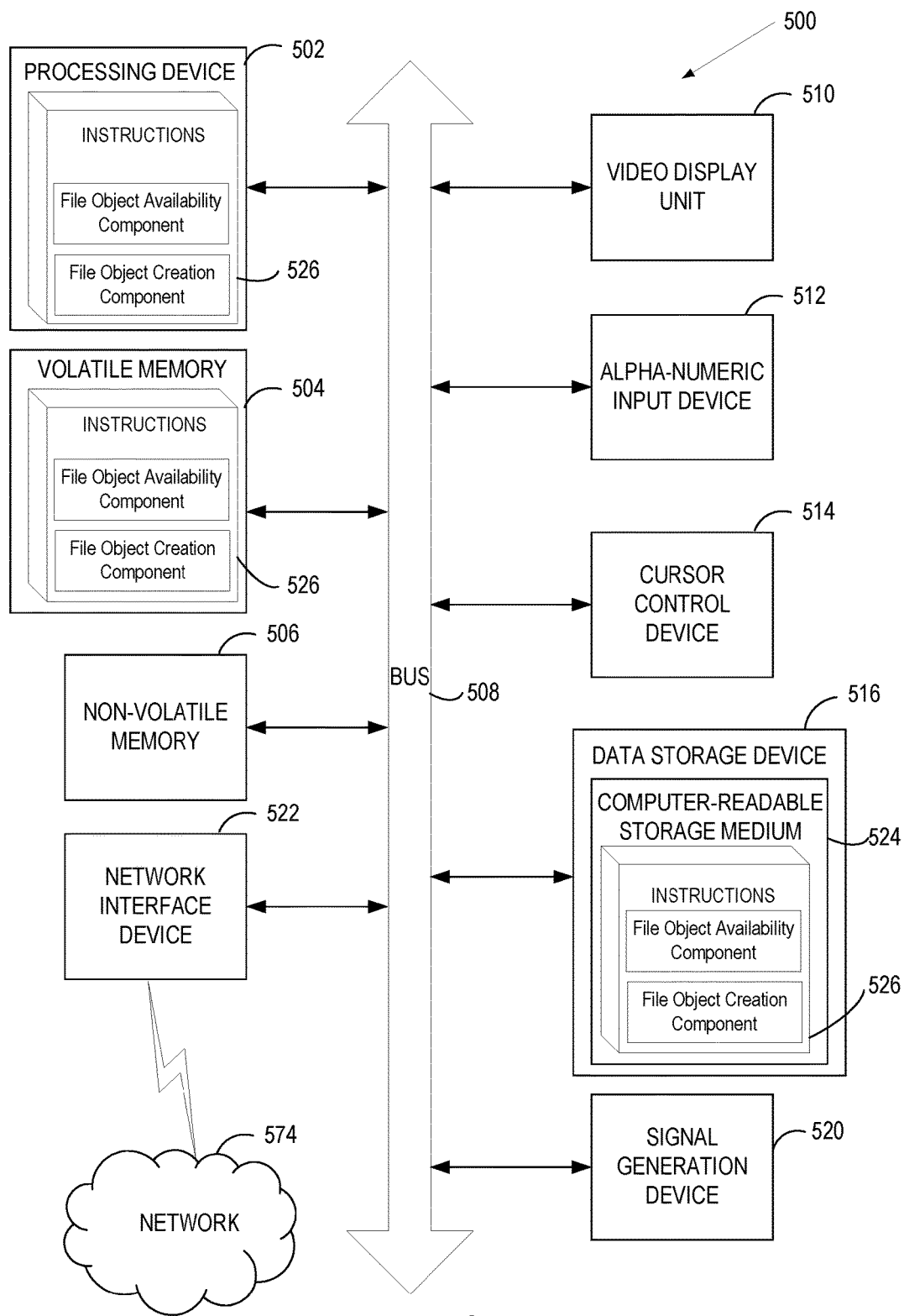
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 500 may correspond to a computing device within system 100 or node device 212 of FIG. 1 and FIG. 2 respectively. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding file object availability component 220 and file object creation component 230 of FIG. 2 for implementing methods 300 or 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "determining," "creating," "initiating," "querying," "generating," "identifying," "selecting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    storing, by a distributed file system comprising a plurality of nodes, a plurality of file objects in multiple different formats;
    determining a base format for the plurality of file objects in view of the multiple different formats;
    responsive to determining the base format, storing a file object in the base format on a node of the plurality of nodes and discarding at least one of the plurality of file objects in the multiple different formats;
    receiving, by the distributed file system, a request of a client for a file object in a first format;
    in response to determining the file object in the first format is missing, querying a node of the plurality of nodes to determine that the file object is stored in the base format;
    creating, by a processing device of the distributed file system, the file object in the first format in view of the file object in the base format; and
    transmitting the file object in the first format to the client.

2. The method of claim 1, wherein the plurality of nodes of the distributed file system comprise a plurality of storage node devices that are interconnected over a network.

3. The method of claim 1, wherein creating the file object comprises the distributed file system transcoding data of the file object in the base format to data of the file object in the first format.

4. The method of claim 1, wherein the request is received at the distributed file system from a mount process executing on a client device and the request conforms with a POSIX standard.

5. The method of claim 1, wherein the request is received at the distributed file system from a process executing on a client device and wherein the request comprises a file object identifier for the file object and information identifying the first format for the file object.

6. The method of claim 1, wherein the file object in the first format comprises interleaved audio data and video data.

7. The method of claim 1, wherein the receiving of the request for the file object comprises receiving a request for a media item over a network from a media service.

8. The method of claim 1, wherein the requested file object is a media item and the first format is at least one of: a particular media item container format, a particular resolution of the media item, or a particular bit rate for serving the media item.

9. The method of claim 8, wherein the container format of the media item comprises at least one of: an MP4 format, an MOV format, or an MDX format.

10. The method of claim 1, further comprising:
storing the file object in the first format on a first node of the distributed file system;
transmitting a second request for the file object in the first format to the first node;
providing the file object in the first format in response to the second request; and
removing the first format of the file object from the first node of the distributed file system after a threshold period of time.

11. The method of claim 1, further comprising:
receiving a new file object;
determining additional formats for the new file object based on historical data, the historical data comprising previously requested formats; and
creating the new file object in each of the additional formats.

12. The method of claim 1, further comprising:
receiving a plurality of media items in multiple different container formats;
determining a base format for the plurality of media items in view of the multiple container formats;
storing the media item in the base format; and
discarding at least one of the plurality of media items in the multiple container formats.

13. A system comprising:
a memory; and
a processing device operatively coupled to the memory, the processing device to:
store a plurality of file objects in multiple different formats in a distributed file system that comprises a plurality of nodes;
determine a base format for the plurality of file objects in view of the multiple different formats;
responsive to determining the base format, store a file object in the base format on a node of the plurality of nodes and discard at least one of the plurality of file objects in the multiple different formats;
receive, by the distributed file system, a request for a file object in a first format;
in response to determining the file object in the first format is missing, querying a node of the plurality of nodes to determine that the file object is stored in the base format; and
create the file object in the first format in view of the file object in the base format; and
transmit the file object in the first format to the client.

14. The system of claim 13, wherein the plurality of nodes of the distributed file system comprise a plurality of storage node devices that are interconnected over a network.

15. The system of claim 13, wherein to create the file object, the processing device is to transcode data of the file object in the base format to data of the file object in the first format.

16. A non-transitory machine-readable storage medium storing instructions that cause a processing device to:
store a plurality file objects in multiple different encodings in a distributed file system that comprises a plurality of nodes;
determine a base encoding for the plurality of file objects in view of the multiple different encodings;
responsive to determining the base encoding, store a file object in the base encoding on a node of the plurality of nodes and discard at least one of the plurality of file objects in the multiple different formats;
receive, by the distributed file system, a request of a client for a file object in a first format;
in response to determining the file object in the first encoding is missing from the distributed file system, determine that the file object is stored in the base encoding;
perform, by the distributed file system, a transcoding procedure on the file object in the base encoding to create the file object in the first encoding; and
transmit the file object in the first encoding over a network.

17. The non-transitory machine-readable storage medium of claim 16, wherein the distributed file system comprises a plurality of storage node devices that are interconnected over a network.

* * * * *